(12) United States Patent
Taketa

(10) Patent No.: US 6,173,361 B1
(45) Date of Patent: Jan. 9, 2001

(54) DISK CONTROL DEVICE ADAPTED TO REDUCE A NUMBER OF ACCESS TO DISK DEVICES AND METHOD THEREOF

(75) Inventor: Suijin Taketa, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/083,347

(22) Filed: May 22, 1998

(30) Foreign Application Priority Data

Jan. 19, 1998 (JP) .................................................. 10-007321

(51) Int. Cl.[7] ....................................................... G06F 13/00
(52) U.S. Cl. ............................................................... 711/113
(58) Field of Search ............................................... 711/113

(56) References Cited

U.S. PATENT DOCUMENTS

| | | | |
|---|---|---|---|
| 5,274,799 | 12/1993 | Brant et al. ................................ | 714/6 |
| 5,315,602 | 5/1994 | Noya et al. ........................... | 714/766 |
| 5,341,381 | 8/1994 | Fuller ....................................... | 714/6 |
| 5,408,644 | 4/1995 | Schneider et al. ........................ | 714/1 |
| 5,418,921 | 5/1995 | Cortney et al. ....................... | 709/234 |

FOREIGN PATENT DOCUMENTS

| | | |
|---|---|---|
| 0 681 238 A1 | * 11/1995 | (EP) . |
| 4-296926 | 10/1992 | (JP) . |
| 5-324206 | 12/1993 | (JP) . |
| 6-119120 | 4/1994 | (JP) . |
| 7-72985 | 3/1995 | (JP) . |

OTHER PUBLICATIONS

Mishra et al., Performance Study of RAID–5 Disk Arrays with Data and Parity Cache, 1996 Internation Conference on Parallel Processing, 1996, pp. 1–222 through 1–229.*

* cited by examiner

*Primary Examiner*—David L. Robertson
(74) *Attorney, Agent, or Firm*—Greer, Burns & Crain, Ltd.

(57) ABSTRACT

A disk control device is operationally connected to a high-order device and operates a plurality of disk devices. A cache is included in the disk control device for storing data including a plurality of parity data from a corresponding plurality of parity groups in the plurality of disk devices. The disk control device also includes a cache management table for indicating the positions of the data stored in the cache. Cache management means is provided for transferring a selected data request by the host control from the plurality of disk devices to the cache when the cache management table indicates that said selected data is not stored in the cache. Control means transfers the selected data from the cache to the high-order device when the cache management means informs the control means that the selected data is stored in the cache. Moreover, the cache management means holds a selected parity data in the cache when data belonging to the same one of the plurality of parity groups as the selected parity data are stored in the cache, and expels the selected parity data from the cache when no data belonging to the same one of the plurality of parity groups as the selected parity data is stored in the cache.

7 Claims, 12 Drawing Sheets

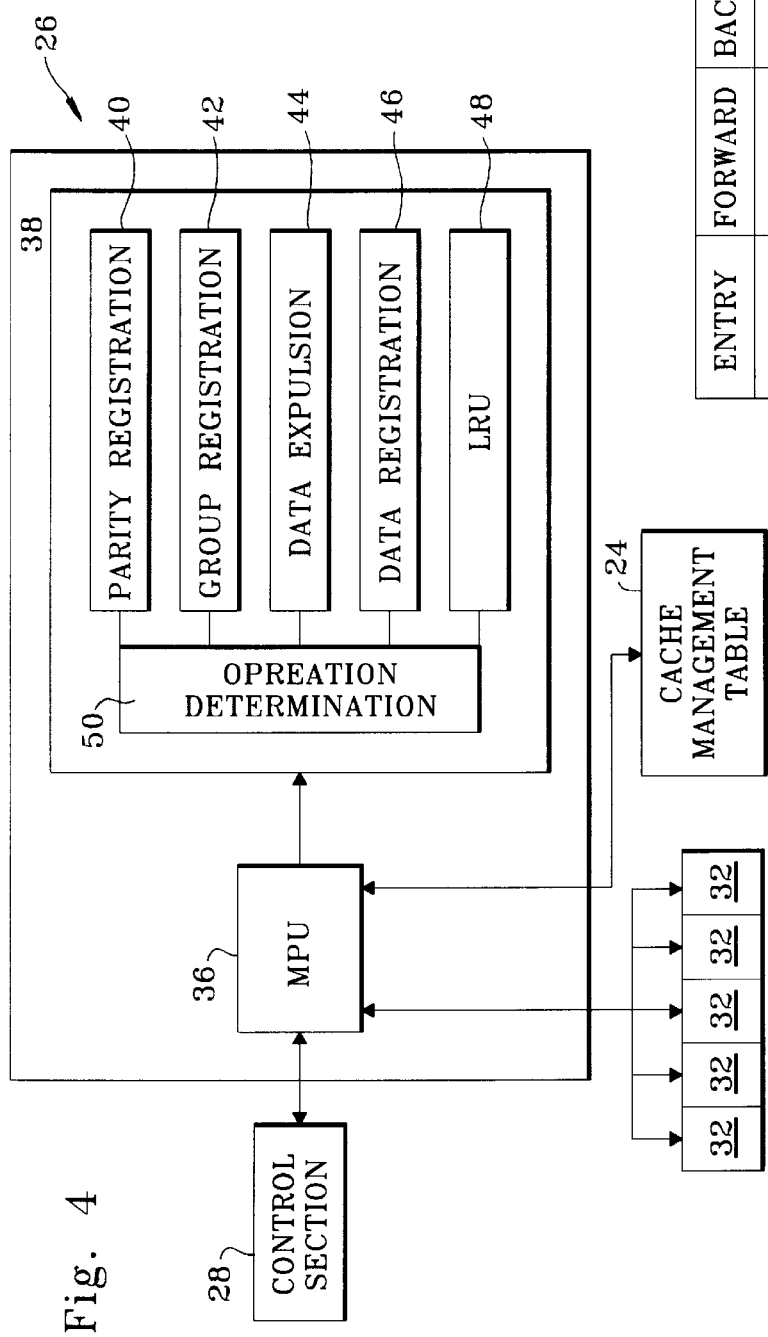

| ENTRY | TARGET BLOCK | BIT MAP | 0BLOCK | 1BLOCK | 2BLOCK | 3BLOCK | PARITY |
|---|---|---|---|---|---|---|---|
| 0 | LB-0~LB-3 | 0001 | | | | 0x0003 | 0x0004 |
| 1 | LB-16~LB-19 | 0010 | | | 0x0030 | | 0x0005 |
| 2 | LB-4~LB-7 | 1000 | x0011 | | | | 0x0015 |
| 3 | LB-12~LB-15 | 0100 | | 0x1029 | | | 0x102C |
| 4 | | | | | | | |

| TOP | BOTTOM |
|-----|--------|
| 3   | 0      |

| ENTRY | FORWARD | BACKWARD |
|-------|---------|----------|
| 0     | 1       | XX       |
| 1     | 2       | 0        |
| 2     | 3       | 1        |
| 3     | XX      | 2        |
| 4     |         |          |

| ENTRY | TARGET BLOCK | 0BLOCK | 1BLOCK | 2BLOCK | 3BLOCK | PARITY |
|-------|--------------|--------|--------|--------|--------|--------|
| 0     | LB-0~LB-3    | 0x0000 | 0x0001 | 0x0002 | 0x0003 | 0x0004 |
| 1     | LB-16~LB-19  | 0x0010 | 0x0021 | 0x0030 | 0x0034 | 0x0005 |
| 2     | LB-4~LB-7    | 0x0011 | 0x0012 | 0x0013 | 0x0014 | 0x0015 |
| 3     | LB-12~LB-15  | 0x1028 | 0x1029 | 0x102A | 0x102B | 0x102C |
| 4     |              |        |        |        |        |        |

DISK CONTROL DEVICE ADAPTED TO REDUCE A NUMBER OF ACCESS TO DISK DEVICES AND METHOD THEREOF

This invention relates generally to a disk control device for disk array systems and more particularly, to a disk control device adapted to be used with RAID-4 and RAID-5 disk systems for increasing the data access speed by reducing the number of accesses by the disk control device to the disk devices.

BACKGROUND OF THE INVENTION

Disk array systems devices which allow great volumes of data to be transferred in and out and from many disks at high transfer speed and with relatively good reliability have been in use for many years. These disk array systems were classified as Redundant Arrays of Inexpensive Disks (RAID) 1 to 5 by Dr. David A. Patterson et al. of the University of California (see ACM SIGMOD Conference, Chicago, Ill., Jun. 1–3, 1988, P.109–166). The present invention relates primarily to RAID-4 and RAID-5, which will now be discussed.

It is known in the art that the reliability of the RAID-4 and the RAID-5 systems is provided by a parity or redundant data which is created from the combination of data stored in the same memory block location of each of the disk devices. The data which create the parity data are formed into a group called a parity group. The parity data of each parity group is stored in each of the disk devices in the array and are included in the parity group.

One of the characteristics of the RAID-4 and the RAID-5 systems is that each time data of a particular parity group is altered, the parity data of that parity group is recalculated and updated so that the redundancy of the parity data is maintained. This requires the disk control device to not only access the memory block of a disk containing the desired data, but also the memory block of the disk containing the corresponding parity data, each time the data is accessed from the disk array. Consequently, this causes a delay in operation, since the disk control device for the RAID-4 and the RAID-5 systems must always access an additional memory block each time data is accessed. In other words, the inherent characteristics of the RAID-4 and the RAID-5 systems result in reduced access speed during the reading and writing processes. Thus, there is a need for a disk control device for the RAID-4 and the RAID-5 systems which is able to increase the access speed.

Accordingly, it is one object of this invention to provide a new and improved disk control device for the RAID-4 and the RAID-5 systems.

Another object is to provide a new and improved disk control device having increased access speed for use with the RAID-4 and the RAID-5 systems.

Yet another object of this invention is to provide a new and improved disk control device for the RAID-4 and the RAID-5 systems which does not access the parity data each time the nonparity data is accessed.

Still another object of this invention is to provide a new and improved disk control device for the RAID-4 and the RAID-5 systems which holds the parity data in a cache until all the nonparity data of the corresponding parity group are transferred out of the cache.

BRIEF SUMMARY OF THE INVENTION

In keeping with one aspect of this invention, a disk control device is operationally connected to a high-order device and operates a plurality of disk devices. A cache is included in the disk control device for storing data including a plurality of parity data from a corresponding plurality of parity groups in the plurality of disk devices. The disk control device also includes a cache management table for indicating the positions of the data stored in the cache. Cache management means is provided for transferring a selected data request by the host control from the plurality of disk devices to the cache when the cache management table indicates that said selected data is not stored in the cache. Control means transfers the selected data from the cache to the high-order device when the cache management means informs the control means that the selected data is stored in the cache. Moreover, the cache management means holds selected parity data in the cache when data belonging to the same one of the plurality of parity groups as the selected parity data are stored in the cache, and expels the selected parity data from the cache when no data belonging to the same one of the plurality of parity groups as the selected parity data is stored in the cache.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which:

FIG. 4 is a block diagram of a cache management section of the disk control device of FIG. 1 in accordance with the principle of this invention;

FIG. 5 is a pointer table in a cache management table of the disk control device of FIG. 1 for indicating the top and the bottom entries of the data stored in a cache;

FIG. 6 is a LRU link table in the cache management table for showing the data stored in the cache and the order in which these data were entered in the cache;

FIG. 7 is an entry table in the cache management table for showing the parity groups of the data stored in the cache;

FIG. 14 is a pointer table in the cache management table for indicating the top and the bottom entries of the parity groups stored in the cache in accordance with an alternate principle of the present invention;

FIG. 15 is a LRU link table in the cache management table for indicating the order of entries of the parity groups in the cache in accordance with the alternate principle of the present invention;

FIG. 16 is an entry table in the cache management table for indicating the parity groups stored in the cache in accordance with alternate principle of the present invention.

DETAILED DESCRIPTION

Figure 1:
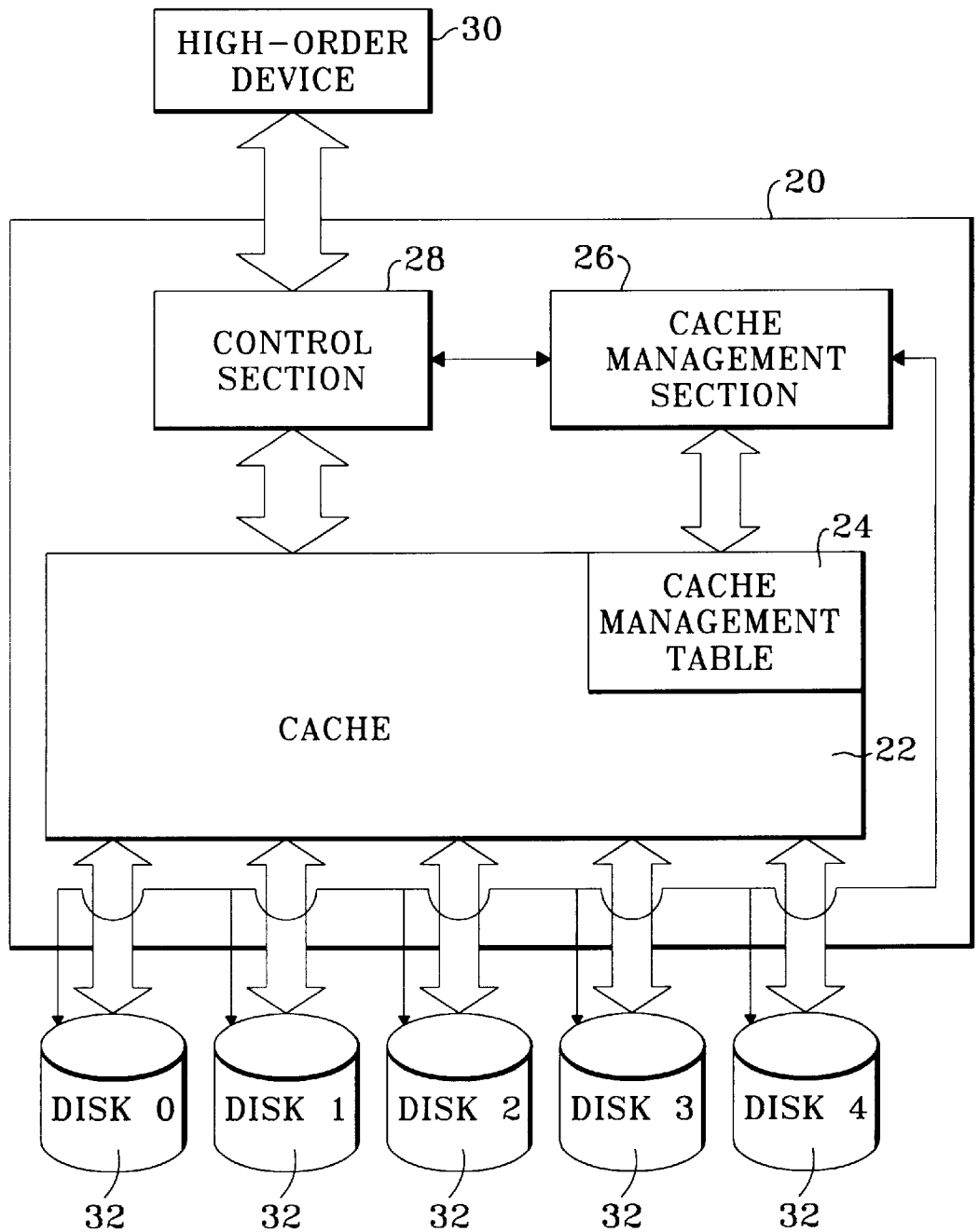
FIG. 1 is a block diagram of a disk control device in accordance with the principle of the present invention.

As seen in FIG. 1, a disk control device 20 includes a cache 22, a cache management table 24, a cache management section 26 and a control section 28. The disk control device 20 is operationally connected between a high-order device 30 and five disk devices 32 (labeled Disk 0-Disk 4), each of which stores a fixed length of data which are accessible to the high-order device via the control device. The number of disk devices 32 connected to the control device 20 can vary as required. Five disk devices are shown in FIG. 1 as a typical number.

The cache 22 at various times stores portion of data stored in the disk devices 32 as required by the high-order device 30, and the cache management table 24 keeps track of these data in the cache including their locations, the order of their entry into the cache 22 and the information about their respective parity groups. The cache management section 26 transfers data between the disk devices 32 and the cache 22 by referring to the cache management table 24. Transfer of data between the high-order device 30 and the cache 22 is performed by the control section 28, as authorized by the cache management section 26.

Figures 2, 3:
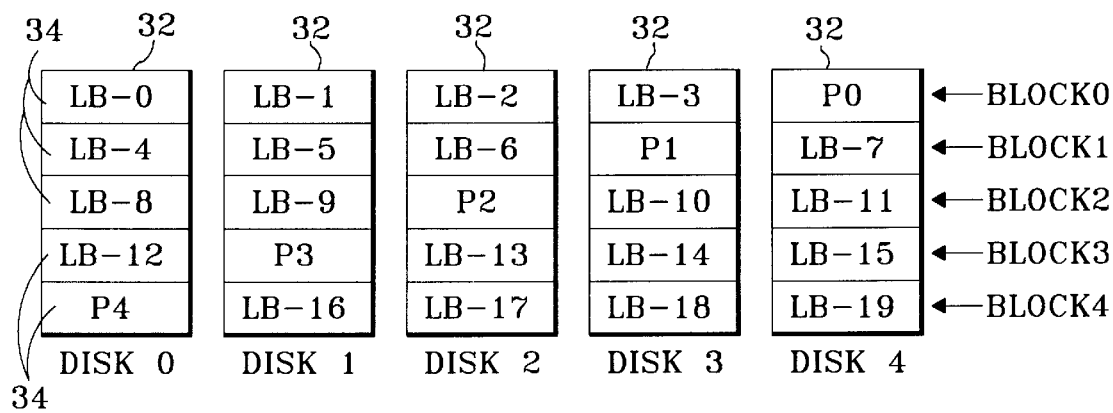
FIG. 2 is a diagram showing the configuration of one type of disk array system.
FIG. 3 is a table used in converting a logical address into a physical address for the disk array of FIG. 2.

As shown in FIG. 2, each of the disk devices 32 has five memory blocks 34 (labeled Block 0 to Block 4), four of which store the transfer or informational data, while one stores the parity or redundant data, which is created in known manner from the combination of the transfer data stored in the other four disk devices. Having this configuration, any data in the disk devices 32 can be identified with a disk device number and a block number, i.e., the physical address.

Most conventional high-order devices 30 recognize the array of disk devices 32 to which it is connected as being a single large-capacity disk device, regardless of the number of disk devices that are actually connected to the high-order device. To be compatible with the high-order device 30, the disk control device 20 operates as if it is connected to a single, virtual disk device having virtual memory blocks. In accessing a particular memory block 34 in the disk devices 32, the high-order device 30 specifies the virtual disk device number of the data and the virtual block number of the data it wishes to obtain, i.e., the logical address.

When the logical address is specified by the high-order device 30, the disk control device 20 converts the logical address into a physical address including the physical disk device number and the physical block number, i.e., the number of the disk device 32 and the memory block 34. Conversion from the logical address to the physical address is accomplished in accordance with the number of the disk devices 32 connected to the control device 20. The desired physical address is obtained from a conversion table 35 shown in FIG. 3, using values A–C, which are calculated as follows:

Value A: Remainder of {Logical address/(Number of physical disk devices–1)}

Value B: Value of {Logical address/(Number of physical disk devices–1)}after the fraction is discarded Value C: Remainder of (Value B/Number of physical disk devices)

If, for example, five disk devices 32 are connected to the disk control device 20 as shown in FIG. 1, and the logical address specified by the high-order device 30 is 11, the values A–C are obtained as follows:

Value A: Remainder of {11/(5–1)}=3

Value B: Value of {11/(5–1)} after the fraction is discarded=2

Value C: Remainder of (Value B/5)=2

As shown in the conversion table 35 of FIG. 3, the values A=3 and C=2 indicate that the physical address corresponding to the logical address 11 is disk 4, block 2.

Turning back to FIG. 2, and examining the same block number in each of the five disk devices 32, it is shown that the transfer data is stored in only four of the five disk devices at that block number. The remaining one of the five disk devices 32 stores the parity data, which is created from the transfer data of the other four disk devices in the same block number.

The disk device 32 in which the parity data is stored is determined by value D which is calculated as follows:

Value D=(Number of physical disk devices–1–Value C)

Assuming as above that the logical address is 11 and the number of disk devices is five, the parity data is stored in disk 2, i.e., Value D=(5–1–2)=2, which is consistent with the diagram of FIG. 2.

The parity data together with the transfer data from which the parity data is created form a parity group. For example, as shown in FIG. 2, parity data P0 is created from transfer data at physical addresses Disk 0/Block 0, Disk 1/Block 0, Disk 2/Block 0 and Disk 3/Block 0 and stored at physical address Disk 4/Block 0. These five blocks form a parity group. In the RAID-5 system, parity data P1 created from data in Disk 0/Block 1, Disk 1/Block 1, Disk 2/Block 1 and Disk 4/Block 1 are stored in Disk 3/Block 1. In the RAID-4 system, the parity data is always stored in Disk 4.

As shown in FIG. 4, the cache management section 26 includes a microprocessor unit (MPU) 36 which is operationally connected to a memory 38. The MPU 36 is also connected to the control section 28, the disk devices 32 and the cache management table 24. The memory 38 includes a parity registration judging unit 40, a group registration judging unit 42, a data expulsion unit 44, a data registration unit 46, a least recently referenced data (LRU) control unit 48. Each of these units or microprograms 40, 42, 44, 46, 48 is connected to an operation determination unit 50, which is also included in the memory 38.

The cache management table 24 provides information regarding data stored in the cache 22, and includes a pointer table 52, a link table 54 and an entry table 56, respectively shown in FIGS. 5–7. The pointer table 52 shows the logical address of the top (last) and the bottom (first) data that are stored in the cache 22. The link table 54 shows the LRU "link" status or the order in which the data from the cache 22 are stored or registered in the cache 22. An "Entry" column of the link table 54 indicates the logical address of the stored data, and the link or relationship between each entry is shown by the logical addresses immediately before and after a selected logical address. For example, the logical address in the "Forward" column of a selected logical address in the "Entry" indicates the logical address of the data which is stored or registered after the data of the selected logical address, and the logical address in the "Backward" column indicates the data which was registered prior to the registration of the data of the selected logical address.

The entry table 56 of FIG. 7 includes a "Target Block" column, a "Bit Map" column, four "Block" columns and a "Parity" column. Each of the entry lines (lines labeled 0–4 shown in FIG. 7) holds information regarding the data in the cache 22 belonging to the same parity group. The values in the "Bit Map" column consist of four bits which correspond to the four "Block" columns, and indicate the status of the data in each of the four data blocks (0 Block, 1 Block, 2 Block and 3 Block) in the parity group. A bit set to "1" indicates that the data belonging to the corresponding block in the parity group is registered in the cache 22, and a bit set to "0" indicates that the data in the corresponding block in the parity group is not registered in the cache 22. For example, the bit map of entry line 0 is set to "0001" in the entry table 56 of FIG. 7, indicating that the data belonging to 3 Block (the fourth block) of the parity group is registered in the cache 22 and that the data belonging to 0 Block, 1 Block and 2 Block are not stored in the cache. The corresponding logical addresses (denoted "LB") of the data blocks 0–3 of the respective parity groups are listed in the "Target Block" column of the entry table 56.

Figure 8:
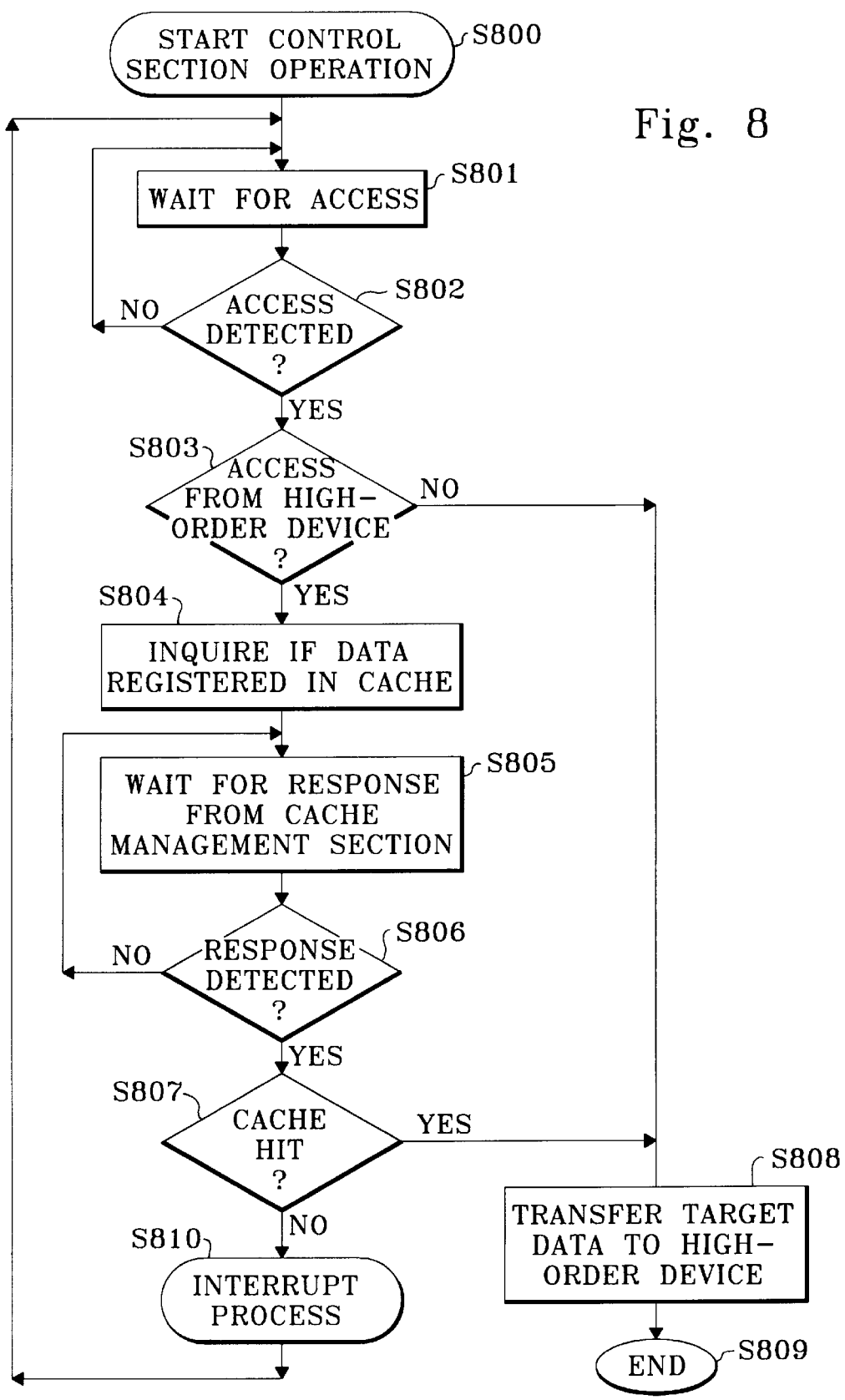
FIG. 8 is a flowchart illustrating the operation of the control section of the disk control device of FIG. 1.

The operation of the control section 28 is now described while referring to the flowchart of FIG. 8. At the start (800), the control section 28 waits for an access from the high-order device 30 or the cache management section 26 (S801). If no access is detected, the process goes back to step (S801). However, if an access is detected (S802), the control section 28 judges whether the access is from the high-order device 30 or from the cache management section 26 (S803).

If the access is from the high-order device 30, the control section 28 inquires of the cache management section 26 as to whether the target data requested by the high-order device is registered in the cache 22 (S804), and then waits for a response from the cache management section (S805). Once a response is detected (S806), the control section 28 analyses the response to determine whether the target data is registered (a "cache hit") or not registered in the cache 22 (a "cache miss") (S807).

If the result is a cache hit, the control section 28 transfers the target data stored in the cache 22 to the high-order device 30 (S808). The storage address of the target data is provided by the cache management section 20 to the control section 28. This finishes the process performed by the control section 28 (S809), and the control section again waits for an access (S801).

If the result is a cache miss at step (S807), however, the control section 28 goes to step (S801) and waits for the target data to be stored in the cache 22 from the disk devices 32 by the cache management section 26 (S810). During this wait, the control section 28 can execute a completely different process. If an access is detected during the wait period, the control section 28 judges whether the access is from the high-order device 30 or from the cache management section 26 (S803).

If the access is from the cache management section 26, the target data is stored in the cache 22 and transferred from the cache to the high-order device 30 (S808). This ends the process (S809), and the control section 28 again waits for an access from either the high-order device 30 or the cache management section 26 (S801).

The operation of the cache management section 26 is now described with reference to the flowchart of FIG. 9. At the start of the operation (S900), the cache management section 26 waits for a communication from the control section 28 (S901). In this state, the MPU 36 of the cache management section 26 functions in accordance with the directions from the operation determination unit 50. The operation determination unit 50 detects communications from the control section 26, determines the process to be performed by the cache management section 26, and activates necessary units 40–48 in the memory 38 for performing various functions.

If a communication from the control section 28 is detected (S902), the operation of the cache management section 26 is passed to the control of the LRU control unit 48 as directed by the operation determination unit 50. The LRU control unit 48 determines whether the target data required by the control section 28 is registered in the cache 22 by checking the link table 54 (see FIG. 6) of the cache management table 24 (S903). If the entry for the target data is found in the link table 54 (a cache hit), the LRU control unit 48 notifies, and returns the process control to, the operation determination unit 50 (S904), which then notifies of the existence of the target data in the cache 22 to the control section 28 by providing it with the storage address of the data (S905). The operation of the cache management section 26 is terminated at this point (S906).

If at step (S903) the entry for the target data is not detected in the link table 54 (a cache miss), the LRU control unit 48 notifies the operation determination unit 50 of its finding and also returns the process control to the operation determination unit 50. The operation determination unit notifies the control section 28 of the cache miss condition (S907), and initiates a process to transfer the target data from the disk devices 32 into the cache 22 (S908), and waits (S909). After the target data is transferred into the cache 22, the cache management section 26 notifies the control section 28 that the data transfer has been completed by providing the storage address of the target data in the cache 22 (S910). This finishes the process by the cache management section 26 (S911).

Figure 9:
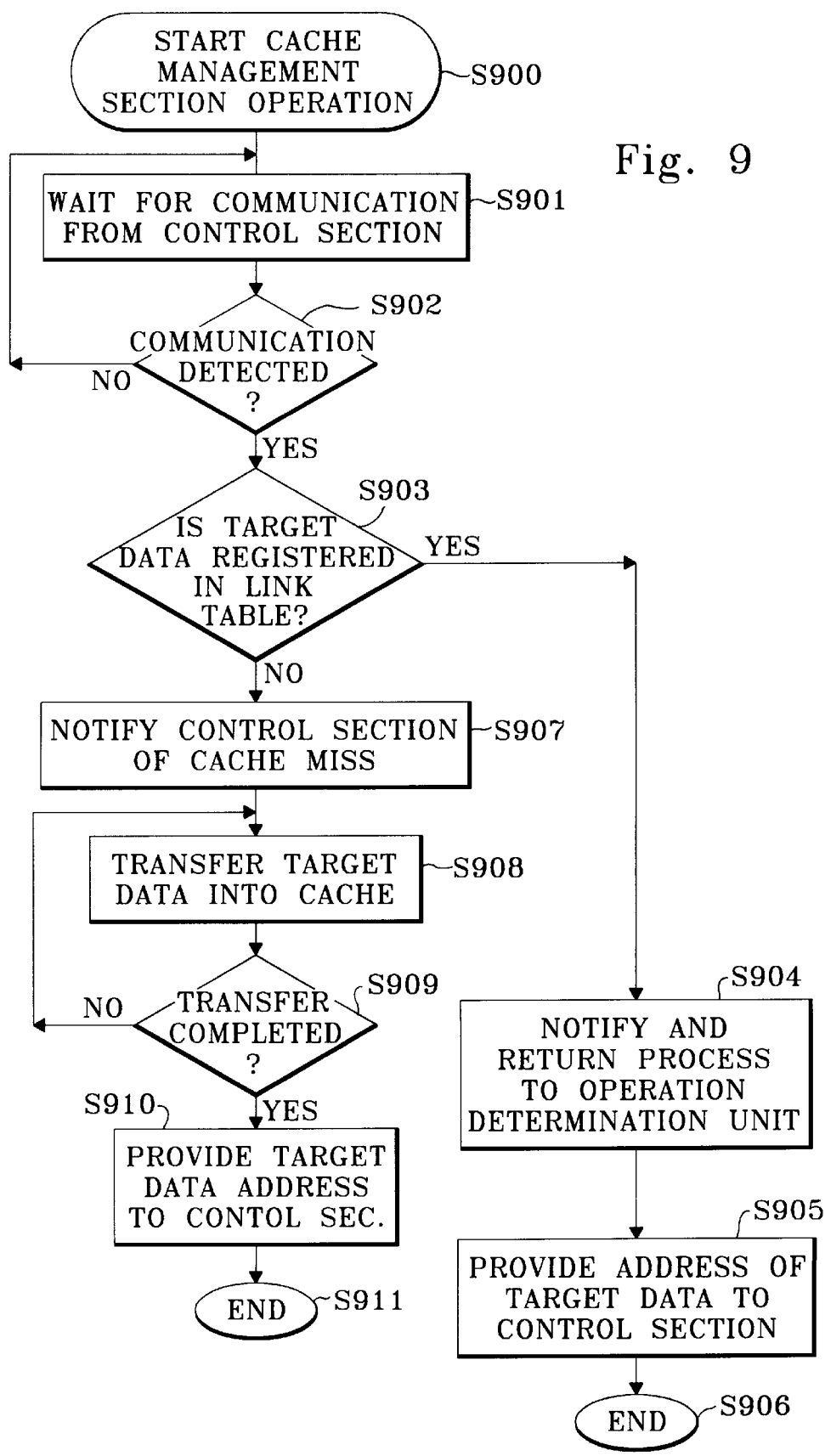
FIG. 9 is a flowchart illustrating the operation of the cache management section.
Figure 10:
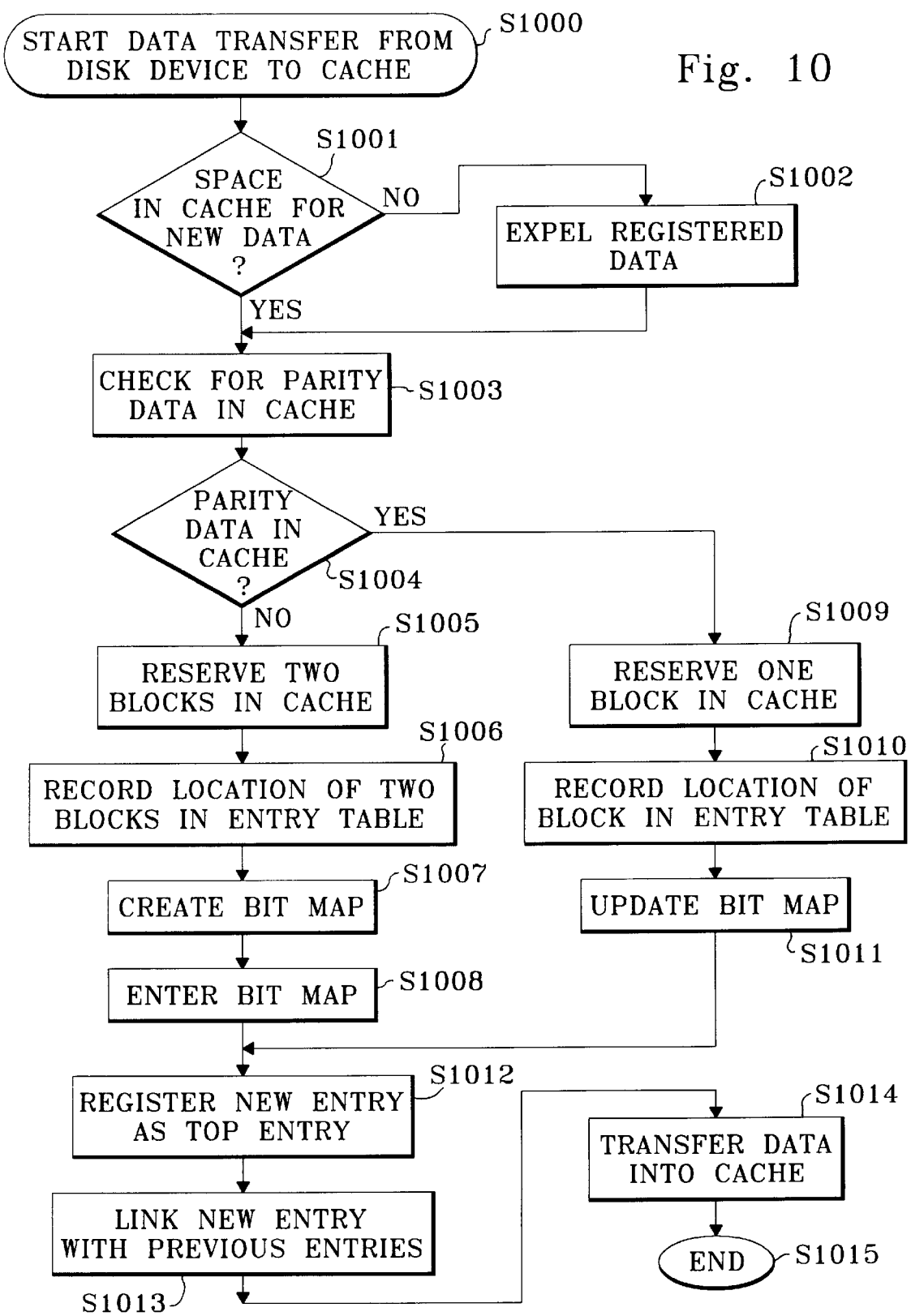
FIG. 10 is a flowchart illustrating the detailed process for transferring data from the disk devices to the cache.

The process for transferring the target data from the disk devices 32 to the cache 22 discussed in step (S908) of FIG. 9 is described in more detail with reference to the flowchart of FIG. 10. If the data requested by the high-order device 30, i.e., the target data, does not exist in the cache 22, as in step (S903) of FIG. 9, the operation determination unit 50 activates the data registration unit 46.

At the start of the data registration process (S1000) in which the target data from the disk devices 32 is transferred to the cache 22, the data registration unit 46 checks to determine whether the cache 22 has a space for storing new data, and whether the link table 54 has a space for a new entry (S1001). If the cache 22 and the link table 54 have no space available, the new data cannot be registered. In this situation, the data registration unit 46 passes the process control to the data expulsion unit 44 to create a space in the cache 22 for the new data by expelling an existing registered data from the cache (S1002). This process is described in detail below with reference to the flowchart of FIG. 11. After making an area available in the cache 22, the data expulsion unit 44 returns the process control to the data registration unit 46.

In accordance with one important aspect of the present invention, the parity data for a particular parity group is maintained in the cache 22 once it is initially stored in the cache, and not transferred back to the disk devices 32, as long as at least one data from the same parity group is also stored in the cache. In this manner, the parity data is not transferred back and forth between the cache 22 and the disk devices 32 each time data belonging to the same parity group as the parity data is transferred between the disk devices and the cache, thereby reducing disk access time.

To accomplish the above-described feature for reducing the disk access time, the data registration unit 46 activates the group registration judgment unit 42, which checks the "Target Block" column of the entry table 56 in the cache management table 24 to determine whether the parity group of the target data is entered in the entry table (S1003). In the present invention, the first time data from a particular parity group is transferred to the cache 22, an entry is made in the entry table 56 for the parity group as a whole, including the parity data. For example, if the logical address of data block 3 of a parity group is LB-3 and this data block is the first from its parity group to be stored in the cache 22, the logical addresses (LB-0, LB-1 and LB-2) of the other data blocks in the parity group are also entered in the "Target Block" column (see entry 0, the first entry line, in the entry table 56). This is the case whether or not the actual data of the logical addresses LB-0, LB-1 and LB-2 are stored in the cache 22.

Therefore, detection of any of the logical addresses of the data blocks of a parity group in the "Target Block" column of the entry table 56, indicates that the parity data for that parity group exists in the cache 22. In the preferred embodiment, the group registration judgment unit 42 checks the "Target Block" column for the logical address of the target data block to determine whether the parity data exists in the cache 22. After giving notification of the detection result to the data registration unit 46, the group registration judgment unit 42 returns the process control to the data registration unit (S1004).

If the logical address of the target data block is not detected in the entry table 56, the data registration unit 46 reserves two blocks of area in the cache 22, one for registering the new data and the other for registering the parity data of the parity group to which the new data belongs (S1005). The data registration unit 46 then records the storage address (location) of the reserved blocks in the corresponding "Block" column and the "Parity" column of the entry table 56 (S1006). The data block positions (i.e., data blocks 0–3 corresponding to the logical address LB) of the new data within the parity group is calculated, and a bit map indicating the block position is created (S1007). For example, if the data block position of the new data is block 3, the bit map would be set to 0001. The bit map is entered in "Bit Map" column of the entry table 56 (S1008) to complete the registration of the new data into the entry table.

If at step (S1003), the logical address of the target data is detected in the "Target Block" column of the entry table 56, the data registration unit 46 reserves only one block of area in the cache 22 for registering the new data (S1009). The data registration unit 46 then records the location of the reserved block in the entry table (S1010), and the data block position of the new data within the parity group is calculated. Then the corresponding bit in the bit map, which is already in the "Bit Map" column of the entry table 56, is set to "1" to finish updating an existing parity group entry in the entry table (S1011).

Regardless of whether or not the parity data is stored in the cache 22, the pointer table 52 and the link table 54 of FIGS. 5 and 6, respectively, are updated after the bit map is updated. As such, the logical address of the new data is entered as the top entry for the link table 54 and the pointer table 52 (S1012). In the link table 54, the logical address of the new data is entered in the "Forward" column of the former top entry so that the new top entry is linked with the previous entries (S1013). Lastly, the data registration unit 46 instructs the disk device 32 containing target data and, if necessary, the one containing the parity data, to transfer the data to the cache 22 (S1014). This ends the process for transferring data from the disk devices 32 to the cache 22 (S1015), and the process control is returned to the operation determination unit 50 at step (S908) of FIG. 9.

It should be noted that while the pointer and the link tables 52, 54 are described above as being updated before the new data actually is transferred into the cache 22, these tables may also be updated after the new data has been transferred to the cache.

Figure 11:
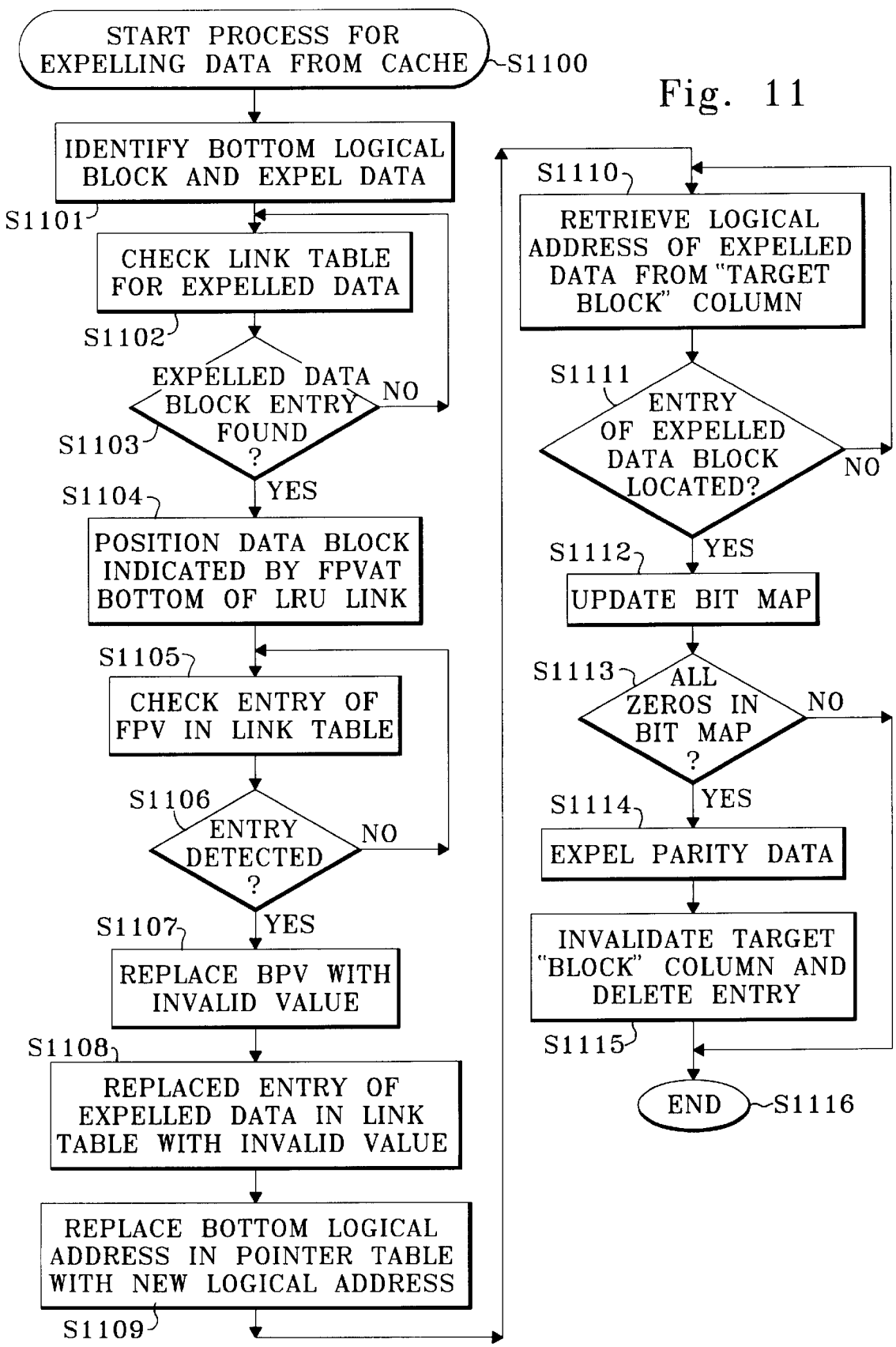
FIG. 11 is a flowchart illustrating the detailed process for expelling data from the cache.

The process in which the registered data is expelled from the cache 22 to create a space for the new data, as briefly described above in step (S1002) of FIG. 10, is described in more detail with reference to the flowchart of FIG. 11. As described above, if the cache 22 does not have sufficient space for the new data, the data registration unit 46 passes the process control to the data expulsion unit 44 to create a space in the cache 22 for the new data by expelling the existing registered data from the cache. At the start of the expulsion process (S1100), the data expulsion unit 44 references the pointer table 52 (shown in FIG. 5) to obtain the logical address of the data at the bottom of the LRU link, i.e., the data least recently referenced. The data identified by this logical address is then expelled from the cache 22 (S1101). If, for example, the logical address at the bottom of the LRU link is 3, as shown in the link table 54 of FIG. 6, the data corresponding to this address would be expelled.

The data expulsion unit 44 then checks the link table 54 for the entry of the logical address of the expelled data (S1102). At step (S1103), if the entry of the expelled data block is not found, the process goes back to step (S1103). However, if that entry is found (S1103), the forward pointer value (FPV), which indicates the logical address of the data that was transferred to the cache 22 immediately after the expelled data, is obtained from the "Forward" column of the entry of the expelled data. Again assuming that the data of logical address 3 has been expelled, the forward pointer value is 18 in the entry table 54 of FIG. 6. Logical address 18 corresponding to the forward pointer value is accordingly positioned at the bottom of the LRU link (S1104).

The data expulsion unit 44 checks the link table 54 again for the entry of the logical address (18) newly positioned at the bottom of the LRU link (S1105). At step (S1106), if the entry is not detected, the process goes back to step (S1105), but if it is detected, the backward pointer value (BPV) in the "Backward" column of that entry is substituted with an invalid value (XX) (S1107). As shown in FIG. 6, value 3 in the "Backward" column of the entry line of logical address 18 is replaced with invalid value XX, since the entry of logical address 18 is now at the bottom of the LRU link. Subsequently, the entry of the expelled data in the link table 54 is replaced with an invalid value (S1108), and the logical address (3) of the expelled data in the pointer table 52 is replaced with the new logical address (18) at the bottom of the LRU link (S1109).

With respect to the entry table 56 of FIG. 7, the data expulsion unit 44 retrieves the logical address of the expelled data from the "Target Block" column of the entry table (S1110). At step (S1111), if the logical address cannot be located the process goes back to step (S1110). After the logical address is detected, the data expulsion unit 44 updates the bit map corresponding to the parity group in which the expelled data belongs. The bit map is located in the "Bit Map" column of the entry table 56, and only the bit corresponding to the expelled data is reset from a "1" to a "0" (S1112).

At this point, the data expulsion unit 44 activates the group registration judgment unit 42 to determine whether there are any other data stored in the cache 22 that belong to the same parity group as the expelled data. The group registration judgment unit 42 performs this function by looking at the bit map corresponding to the parity group to determine whether all the bits in the bit map are 0's (S1113). If all the bits are 0's, then no data is stored in the cache 22 that belongs to the same parity group as the expelled data. However, if the bit map has at least one "1", then there are data stored in the cache 22 which belong to the same parity group as the expelled data.

If all of the bits in the bit map are 0's, the data expulsion unit 44 expels the parity data from the cache 22 (S1114), and records an invalid value in the "Target block" column of the entry of the expelled data to delete the entry (S1115). The data expulsion process is then ended (S1116), and the data registration unit 46 continues with the process for transferring the target data from the disk devices 32 to the cache 22 at step (S1002) of FIG. 10.

However, if there are other data in the cache 22 that belong to the same parity group as the expelled data, the data expulsion unit 44 updates only the corresponding bit map as explained above, the parity data is held in the cache and the entry is not deleted from the entry table 56. The data expulsion process is ended at this point (S1116), and the data registration unit 46 continues with the process for transferring the target data from the disk devices 32 to the cache 22 at step (S1002) of the flowchart of FIG. 10.

In the preferred embodiment of the present invention, the cache management section 26 includes the MPU 36 and the memory 38, and each of the functions described above is performed in accordance with the instructions from the microprograms stored in the memory. It is contemplated, however, that the cache management section 26 may also use hard-wired logic to realize functions similar to those described above.

Figure 12:
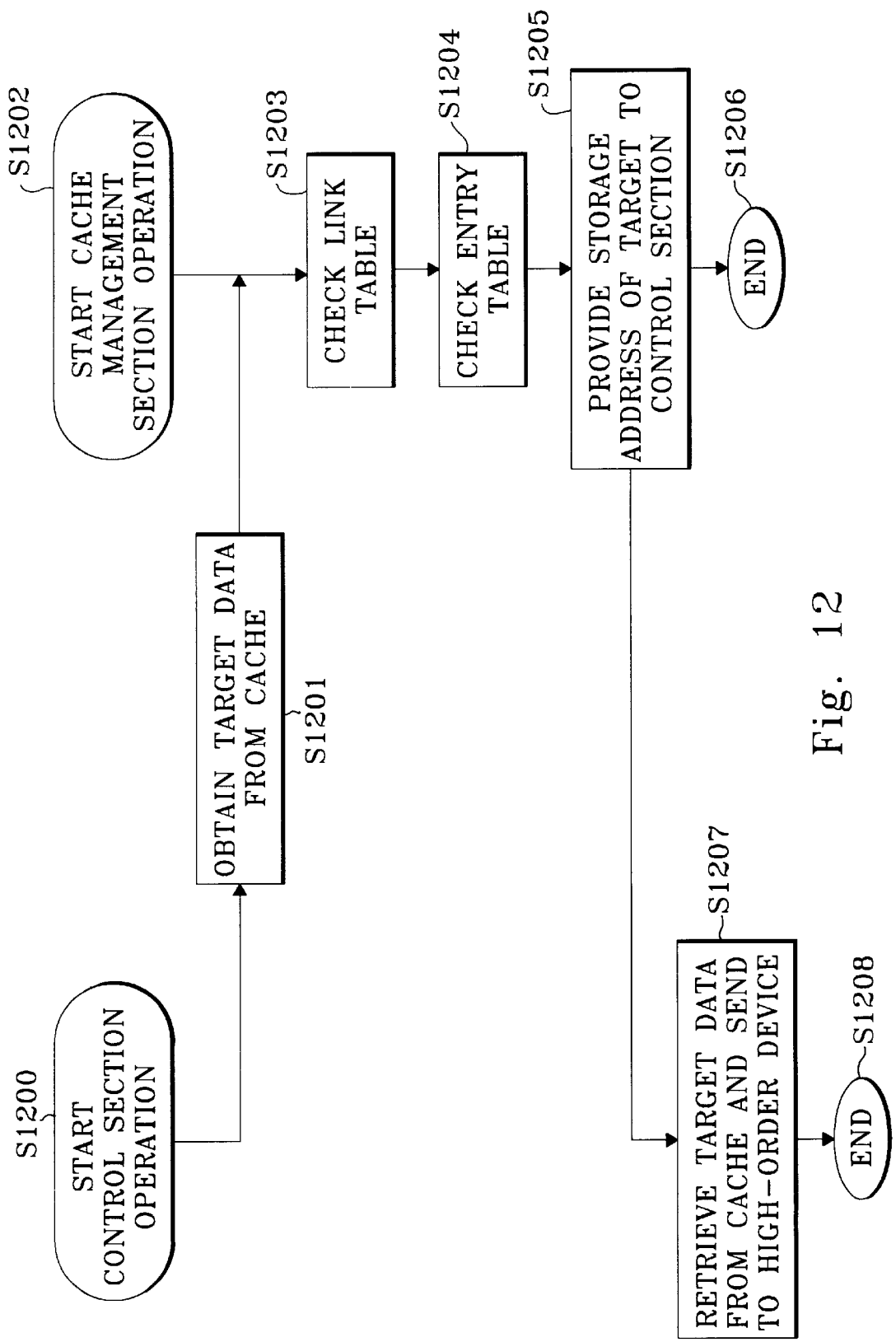
FIG. 12 is a flowchart illustrating the operations of the control section and the cache management section in reading data from the cache when the data is present in the cache.
Figure 13:
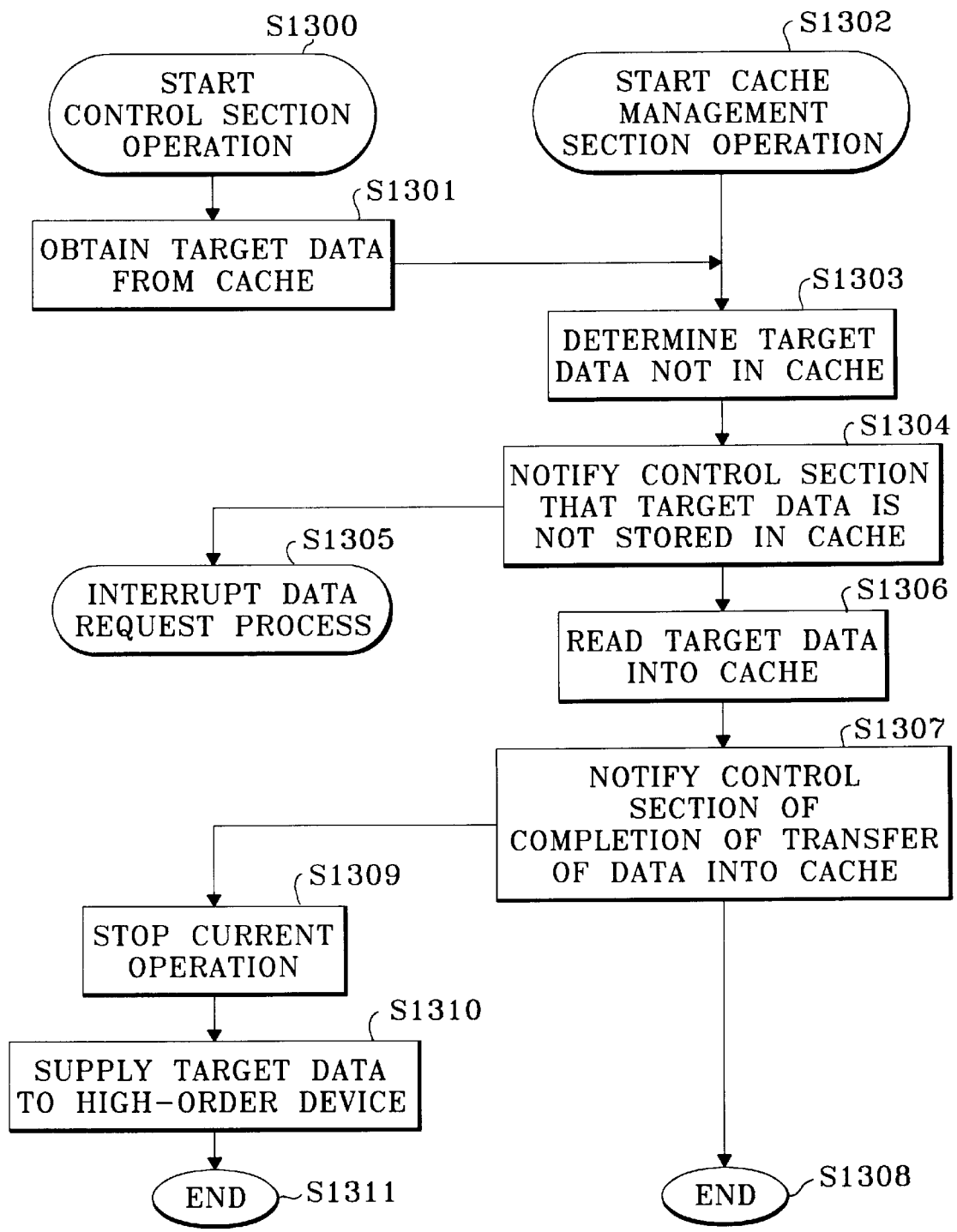
FIG. 13 is a flowchart illustrating the operations of the control section and the cache management section in reading data from the cache when the data is not present in the cache.

The interaction of the control section 28 with the cache management section 26 in performing the general operation of the disk control device 20 is described below with reference to FIGS. 12 and 13. When the high-order device 30 requests data from a particular logical address, the control section 28 (S1200) sends a signal to the cache management section 26 to obtain the requested data from the cache 22 (S1201). The cache management section 26 (S1202) checks the link table 54 in the cache management table 24 to determine whether the target data exists in the cache 22 (S1203).

Assuming, for example, that the target data requested by the high-order device 30 is in logical address 13, which is listed in the fourth entry line of the link table 54, it is determined that the target data is stored in the cache 22. Subsequently, the cache management section 26 checks "Target Block" column of the entry table 56 for the logical address (LB-13) that corresponds to the target data (S1204). As shown in FIG. 7, logical address 13 of the target block is in entry line 3 and includes logical address LB12 to LB15. In addition to checking the link table 54 as in step (S1203), the cache management section 26 also looks at the "Bit Map" column of the entry table 56 to double check whether the target data of the logical address 13 is stored in the cache 22, which is the case in the instant example as shown in the FIG. 7 (see entry line 3, column labeled "1Block"). The cache management section 26 then notifies the control section 28 of the existence of the target data in the cache 22 by providing the data storage address of the target data in the cache 22 (S1205). This finishes the operation of the cache management section (S1206). The operation of the control section is finished (S1208) after the control section 28 retrieves the target data from storage address in the cache 22 specified by the cache management section 26, and sends the target data to the high-order device 30 (S1207).

In the above description regarding the overall operation between the control section 28 and the cache management section 26, it was assumed that the target data requested by the high-order device 30 exists in the cache 22. A description will now be given with reference to FIG. 13 while assuming that the target data does not exist in the cache 22. When the high-order device 30 requests data from a particular logical address, the control section 28 at the start of this process (S1300) sends a signal to the cache management section 26 to obtain the target data from the cache 22 (S1301). In response, the cache management section 26 (S1302) checks the link table 54 in FIG. 6 for the logical address of the target data. If the logical address specified by the high-order device 30 is 11, for example, and the link table 54 is as shown in FIG. 6, logical address 11 would not be found in the link table. At this point, it is determined that the target data does not exist in the cache 22 (S1303).

The cache management section 26 notifies the control section 28 that the target data does not exist in the cache 22 and that it has started the process to read the data from the disk devices 32 into the cache (S1304). Upon receiving this notification from the cache management section 26, the control section 28 interrupts the operation for processing the data request from the high-order device 30 until the cache management section 26 stores the target data in the cache (S1305). Then the control section 28 executes a different process until the target data is stored in the cache 22. Meanwhile, the cache management section 26 performs the process to read the target data into the cache 22 (S1306), which is described above with reference to FIGS. 10 and 11 and further described below.

After the target data, and also the parity data if necessary, is transferred to the cache 22 from the disk devices 32, the cache management section 26 notifies the control section 28 of the completion of the transfer process by providing the data storage address of the target data in the cache (S1307). The data request operation for the cache management section 26 is ended at this point (S1308).

When the completion notice is received from the cache management section 26, the control section 28 interrupts or terminates the process that it was performing (S1309), and supplies the data from the storage address provided by the cache management section 26 to the high-order device 30 (S1310). The data request operation for the control section 28 is ended at this point (S1311).

The step (S1306) described above for reading the target data into the cache 22 requires converting the logical address received from the control section 28 into a physical address. For example, if the logical address is 11, the physical address becomes Disk 4/Block 2 since values A, B and C would be 3, 2 and 2, respectively, using the equations given above for obtaining these value. Using the physical address, the cache management section 26 locates the disk device 32 and the block number where the target data is stored. The target data is then read into the cache 22. If the parity data for the parity group of the target data does not already exist in the cache 22, the parity data is also read into the cache as described above in reference to step (S1005) of the flowchart of FIG. 10. The disk device 32 that stores the parity data is determined from the equation given above for obtaining value D. If the logical address of the target data is 11, then value D would be 2 and the parity data would be in Disk 2.

After the physical address is calculated and before the target data is read into the cache 22, the cache management section 26 reserves an area in the cache for the target data.

This process is described above with reference to flowcharts of FIGS. 10 and 11, and again described below using logical address 11 as an example. To reserve an area in the cache 22, the cache management section 26 first checks the link table 54 for a blank entry (see step (S1001) in the flowchart of FIG. 10). If there is no blank entry line, the cache management section 26 expels the least recently referenced data from the cache 22, i.e., the data at the bottom of the LRU link (see step (S1002) in the flowchart of FIG. 10 and the flowchart of FIG. 11). However, if the link table 54 is as shown in FIG. 6, for example, there is an unused entry line (the last line of the link table 54). The logical address of the new data is entered in this unused line by the cache management section 26.

If the link table 54 permits a new entry, either as a result of the least recently referenced data being expelled or unused area being available, the cache management section 26 reserves one block of area in the cache 22 for storing the target data. Assuming that the parity group of the target data is not registered in the cache 22, one additional block of area is reserved in the cache 22 for storing the parity data because the entry table 56 would not already store the parity data. Thus, the cache management section 26 reserves two blocks of area in the cache 22, and records the allocation information into the entry table 56 (best seen in FIG. 7).

Recording the information regarding the reserved blocks involves entering the logical addresses LB-8 to LB-11 in the "Target Block" column of an open entry line in the entry table 56, since as shown in FIG. 2, logical addresses LB-8 to LB-11 belong to the same parity group. The bit map for the new entry is set to "0001," since LB-11 corresponds to the fourth data block of the parity group and the fourth bit of the bit map. The bit map is recorded in the "Bit Map" column of the entry table 56, which completes the registration of the new entry in the entry table by the cache management section 26 (see steps (S1007) and (S1008) of the flowchart of FIG. 10).

The cache management section 26 then updates the link table 54 (seen in FIG. 6) by entering new logical address 11 in the "Entry" column of the unused entry line and entering an invalid value (XX) in the "Forward" column as the forward pointer value (FPV) and the logical address of the former top entry (13) in the "Backward" column as the backward pointer value (BPV) for the new top entry 11. Then the cache management section 26 changes the value in the "Forward" column of the former top entry (13) from the invalid value (XX) to the logical address of the new top entry, which is 11. The cache management section 26 also changes the value in the "Top" column of the pointer table 52 from 13 to 11 to indicate that data of logical address 11 is at the top of the LRU link among the data stored in the cache 22.

After the link and the pointer tables 52, 54 are updated, the cache management section 26 respectively records the data storage addresses of logical address 11 and the parity data in the corresponding "3 Block" and "Parity" columns of the entry table 56. Then the cache management section 26 instructs the disk device 32 (Disk 4/Block 2) corresponding to logical address LB-11 and the disk device 32 (Disk 2/Block 2) which holds the parity data (P2) to transfer the data to the storage addresses recorded in the "3 Block" and the "Parity" columns. After the target data and parity data are transferred to the cache 22, the cache management section 26 notifies the control section 28 of the completion of the data transfer process.

In the above-described operation of the invention, the target data is transferred individually from the disk devices 32 to the cache 22. In accordance with another aspect of the present invention, the target data is obtained by transferring parity group of the target data from the disk devices 32 to the cache 22 in its entirety. In other words, the entire parity group of the target data is treated as the target data itself. Accordingly, the numbers in the pointer table 58 and the link table 60 of FIGS. 14 and 15 designate the entry order numbers of the parity groups in the cache 22, in contrast to the pointer and the link tables 52, 54 of FIGS. 5 and 6 which numbers designate the logical address of each data stored in the cache 22. The entry order numbers in the pointer and the link tables 14, 15 correspond to the entry line numbers in the "Entry" column of the entry table 62 shown in FIG. 16.

The entry table 62 consists of the "Entry" column, the "Target Block" column, four "Block" columns that store the cache storage addresses and the "Parity" column. The parity group of the target data are registered in the cache 22 and added to the entry table 62 in the order of registration. For example, the entry numbers are allocated to the parity group in ascending order. The entry table 62 of FIG. 16 shows that the parity groups were registered in the order of LB-0–LB-3, LB-16–LB-19, LB-4–LB-7, and LB-12–LB-15 and have the entry numbers 0 to 3, respectively.

In operation, the control device 20 functions the same as described above with reference to the flowchart of FIG. 12, when the target data requested by the high-order device 30 exists in the cache 22, i.e., when there is a "cache hit," (see the flowchart of FIG. 12). Accordingly, no additional description is given regarding the operation of the control device 20.

Figure 17:
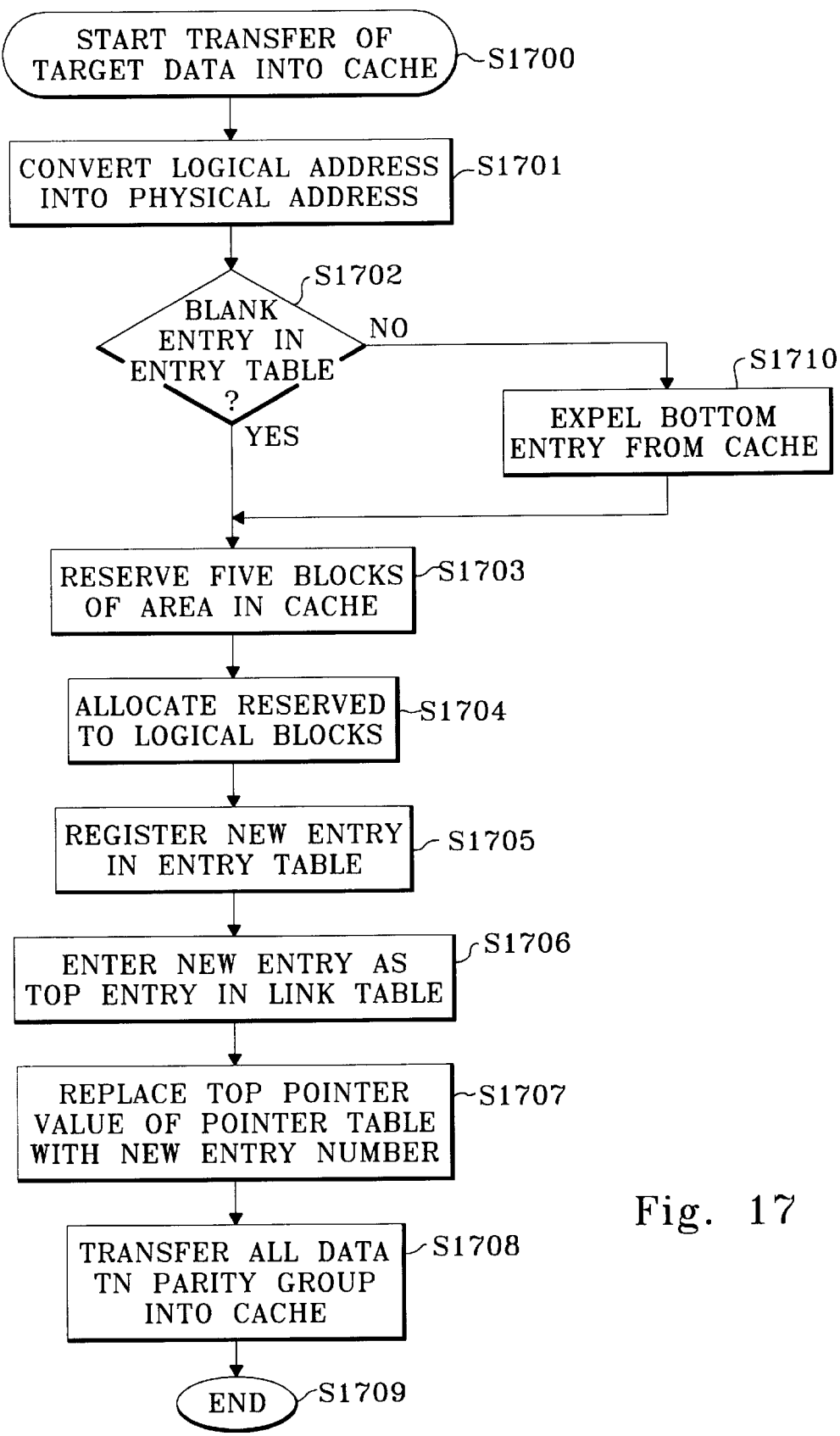
FIG. 17 is a flowchart illustrating the operation of the control device for transferring the target data from the disk devices to the cache in accordance with the alternate principle of the present invention.

When the target data is not stored in the cache 22, the operation is still the same as described above with reference to the flowchart of FIG. 13, but only up to step (S1305). The process in which the target data is read into the cache 22, as in step (S1306) of the flowchart of FIG. 13, is different than in the first aspect and is described below with reference to FIG. 17.

Initially, the cache management section 26 converts the logical address received from the control section into a physical address using the formulas given above for calculating values A, B and C (S1701). For example, if the high-order device 30 request data from logical address 11, the physical address becomes Disk 4/Block 2, because values A, B and C would be 3, 2 and 2, respectively. The cache management section 26 then checks the entry table 62 for a blank entry (S1702).

If a blank entry line is available, the cache management section 26 reserves five blocks of area in the cache 22, one block for the target data and the remaining four for the the parity data and the non parity data which are in the same parity group as the target data (S1703). Even when the high-order device 30 requires only one block of data, for example, the target data at logical address LB-11, four more blocks are reserved of the remaining data at logical addresses LB-8, LB-9, LB-10 and parity data P2, which belong to the same parity group as the target data. Afterwards, the cache management section 26 allocates the five reserved blocks of area in the cache 22 to the logical blocks in the parity group, i.e., to the four "Block" columns and the "Parity" column in the entry table 62 (S1704). Then the cache management section 26 records the information regarding the parity group in the entry table 62 to complete the registration of the new entry into the entry table, such as entering logical addresses of the data in the "Target Block" column and entering the storage address of the parity data and the nonparity data including the target data in the "Block" columns (S1705).

To update the link table 60, an invalid value (XX) is inserted in the "Forward" column of an open entry line as the forward pointer value (FPV), and the entry number for the current top entry is inserted in the "Backward" column of the open entry line as the backward pointer value (BPV). Then the cache management section 26 changes the forward pointer value of the former top entry with the entry number of the new top entry (S1706). For example, if the newly registered entry number is 4 as shown in the link table 60 of FIG. 15, the cache management section 26 changes the forward pointer value of entry line 4 to an invalid value (XX) and the backward pointer value to 3, which is the former top entry number. The forward pointer value of entry line 3 is also changed to 4, which is the new top entry. The pointer table 58 (shown in FIG. 14) is updated by replacing the value in the "Top" column with the entry line number (4) of the new entry (S1707). Lastly, the cache management section 26 instructs the disk devices 32 to transfer all the data in the parity group of the target data to the cache storage addresses indicated in the "Block" columns of the entry table 62 (S1708). This completes the process for registering a target data into the cache 22 by registering the entire parity group in the cache 22 (S1709).

If at step (S1702), no blank entry line is available, the oldest or bottom entry is expelled from the cache 22 to make room for the entry of the target data into the cache (S1710). It should be noted that while the link table 20 is described above as being updated before the data in the parity group are actually registered or stored into the cache 22, the link table may also be updated after the registration of the parity group is confirmed.

While the principles of the invention have been described above in connection with specific apparatus and applications, it is to be understood that this description is made only by way of example and not as a limitation on the scope of the invention.

What is claimed is:

1. A disk control device operationally connected to a high-order device for operating a plurality of disk devices, and having a cache for storing a plurality of data blocks including a plurality of parity data from a corresponding plurality of parity groups in the plurality of disk devices, said disk control device comprising:

a cache management table for indicating positions of the data blocks stored in the cache;

cache management means for transferring a selected data block requested by the high-order device from the plurality of disk devices to the cache when said cache management table indicates that said selected data block is not stored in the cache; and control means for transferring said selected data block from said cache to said high-order device when said cache management means informs said control means that said selected data block is stored in the cache;

wherein said cache management means holds a selected parity data in the cache when at least one data block belonging to the same one of the plurality of parity groups as said selected parity data is stored in the cache, and expels said selected parity data from the cache when none of the data blocks belonging to the same one of the plurality of parity groups as said selected parity data are stored in the cache.

2. The control device as defined in claim 1 wherein said cache management means includes group registration judgment means for accessing the cache management table to determine whether said at least one data block belonging to the same one of the plurality of parity group as said selected parity data exists in the cache.

3. The control device as defined in claim 1 wherein said cache management means includes means for determining whether said selected parity data exists in the cache.

4. The control device as defined in claim 1 wherein said cache management section includes LRU control means for determining the priority of the data blocks stored in the cache based on a relative order in which the data blocks are accessed by said cache management means.

5. The control device as defined in claim 1 wherein said cache management section includes data registration means for transferring said selected parity data into the cache a first time one of a plurality of data blocks in the same one of the plurality of parity group as said selected parity data is transferred into the cache.

6. The control device as defined in claim 1 wherein said cache management section includes data registration means for transferring, as a unit, a parity group of said selected data block including a corresponding parity data of said parity group, when said selected data is requested by said high-order device.

7. Method for reducing a number of accesses to disk devices by a disk control device which is operationally connected to a high-order device and having a cache for storing data blocks and parity data from a plurality of parity groups in the disk devices, said method comprising the steps of:

holding selected parity data in the cache when at least one data block belonging to the same one of the plurality of parity groups as said selected parity data is stored in the cache; and expelling said selected parity data from the cache when said none of the data blocks belonging to the same one of the plurality of parity groups as said selected parity data are stored in the cache.

\* \* \* \* \*